Oct. 9, 1962
C. L. WELLINGTON
3,058,040
ELECTRONIC CONDENSERS
Filed Dec. 31, 1956
2 Sheets-Sheet 1
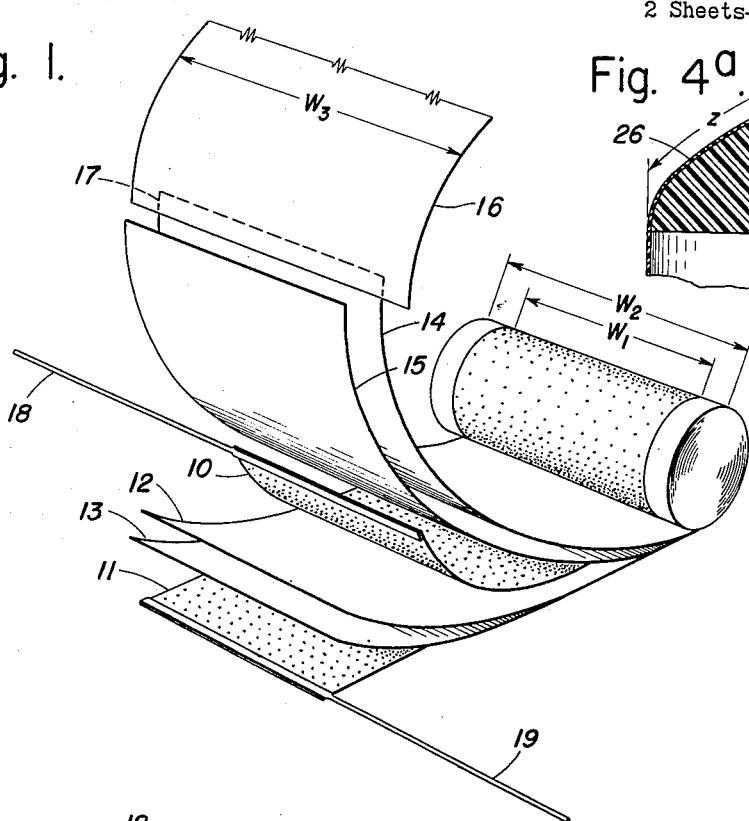
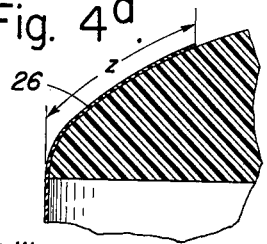
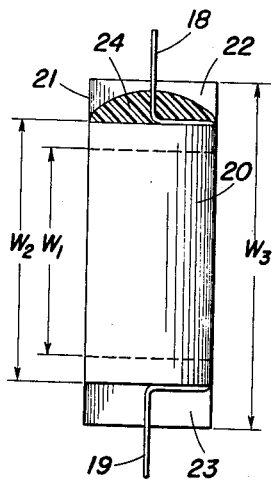
Fig. 2.
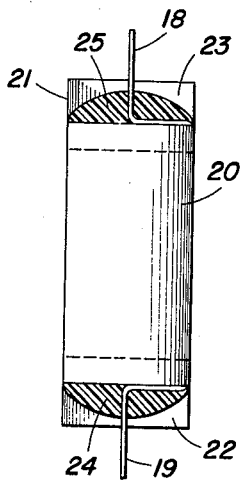
Fig. 3.
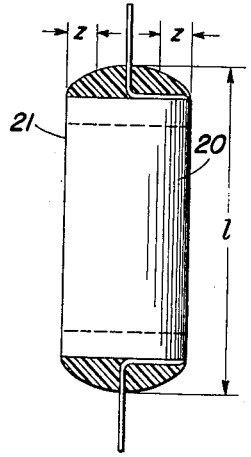
Fig. 4.
INVENTOR
Cary L. Wellington Oct. 9, 1962 C. L. WELLINGTON 3,058,040
ELECTRONIC CONDENSERS
Filed Dec. 31, 1956 2 Sheets-Sheet 2

INVENTOR
Cary L. Wellington

United States Patent Office 3,058,040
Patented Oct. 9, 1962

3,058,040
ELECTRONIC CONDENSERS
Cary Louis Wellington, 28 Harbor St., Stamford, Conn.
Filed Dec. 31, 1956, Ser. No. 631,730
2 Claims. (Cl. 317—230)

This invention relates to improvements in the manufacture of electronic condensers of the kind in which the component elements are in the form of strips wound to form a roll.

Such condensers herein briefly termed roll strip condensers comprise metal strips or metal foil alternating with layers of paper, plastic, etc. This condenser roll has terminals or leads connected to each metal strip to extend from the end of the roll. This condenser roll is normally encased in a prefabricated rigid tube sealed or closed at the ends.

It is among the objects of this invention to provide such condensers to be of great compactness while reducing their production cost. Otherwise expressed, the object is to improve such rolled strip condensers in a manner to make possible a reduction in size and weight, as well as simplified, speedier, and more economical manufacturing procedure. Other objects are improved performance and greater durability.

All capacitors and especially electrolytic capacitors experience a rise in temperature when put to use. That is to say, electrolytic capacitors of all types degenerate when idle, and when being put into service, during an initial period of self-restoration or re-aging, will leak larger quantities of current than under conditions of normal use, the amount of such leakage depending upon the type of electrolytic capacitor and upon the type and length of service.

Because of the occurrence of this initial period of re-aging of an electrolytic capacitor when it is put back into service, the heat generated is sometimes sufficient to vaporize some of the electrolyte. Therefore, all electrolytic capacitors have means enabling them to release an excessive build-up of vapor pressure to avoid condenser bursting. Repeatedly, more and more electrolyte is thus lost to the atmosphere, the capacitor thus degenerating until it fails completely.

Therefore, it is another object to provide such condensers capable of disseminating its self-generated heat as rapidly as possible, as well as to discourage or prevent the loss of electrolyte, during the period of temperature rise and re-aging. Otherwise expressed, the object is to accelerate the dissemination of the heat, as well as to contain and preserve the electrolyte in spite of a pressure build-up, until the capacitor has aged sufficiently and begins to cool down when the electrolyte recondenses and is not lost to the atmosphere.

Broadly, these objects are attained, according to this invention, by substituting for the usual rigid tubular condenser casing a closely or tightly fitted jacket of thin plastic film material, thus eliminating the heat insulating air space between the condenser roll and the rigid type of casing. Importantly, this plastic jacket material is such as to permit a degree of distention sufficient to accommodate small quantities of vaporization of the electrolyte, so that when the capacitor has aged sufficiently and begins to cool down, the electrolyte recondenses and is not lost to the atmosphere allowing the jacket to recontract to is closely fitted condition around the condenser roll.

All capacitors in use have some designation of their capacitance, voltage rate, and manufacturer's name. Heretofore, there was required extra labor and special machinery for placing this information on the casing that contained the condenser roll. Such information can be either the printed word, or color strips, or any combination thereof. It is another object of this invention to provide a highly economical method of applying this information to the condenser by the use of simple equipment associated with the end of the condenser winding operation itself.

In conventional manufacture the assembly of the component strips is wound to form a roll under carefully controlled conditions and the resulting condenser roll as it comes off the condenser winding machine must then be inserted into a prefabricated rigid tubular casing and sealing must be applied to the ends thereof. For practical reasons the inside diameter of the tube must be such as to provide sufficient working clearance for the insertion of the condenser roll into the tubular casing, and the presence of an air space between them is, therefore, unavoidable. In some instances the encasing tube is in the form of a cardboard tube having its ends sealed with a sealing compound for the protection of the condenser roll. In other instances the casing is a porcelain or metal tube with seals or closures provided at the ends.

Referring to the condenser of the electrolytic type, metal strips are coated with a film of di-electric deposit alternating with strips or interlayers of absorbent material such as paper saturated or impregnated with a suitable electrolyte solution. That is, the metal strips which are more precisely known as cathode and anode respectively have their surfaces covered and occluded by a deposit of di-electric oxide such as may be formed by anodizing on the metal surfaces. The assembly of coated metal strips and absorbent interlayers is wound to form the condenser roll which is treated by soaking in an electrolytic solution of high boiling point of which ethylene glycol is a conventional example. That is to say, the electrolytic solution penetrates and impregnates the absorbent layer which thus becomes a wet conductor or carrier of the electrolyte. The condenser roll must be encased securely in a suitable casing for the containment and preservation of the electrolyte. Such a casing may be in the form of a porcelain tube or it may be a metal tube or again combined with closure plugs or resilient rubber-like material where the ends of the can are crimped inwardly to insure gripping engagement with the rubber plugs.

Referring to the condenser of the non-electrolytic type there is employed an assembly of strips of metal foil alternating with paper strips as di-electric interlayers. This strip assembly forms a condenser roll from each end of which extends a terminal wire or lead connected with a respective metal foil. Such condensers may be of the inductive or noninductive kind, and this invention is applicable to either one of them. Only the non-inductive type is herein illustrated. Again, the condenser roll, irrespective of whether it be the inductive or non-inductive type, is inserted into a prefabricated tubular casing, dimensioned to provide the unavoidable air space between the roll and the surrounding tube.

The objects of this invention are attained by employing, instead of a prefabricated rigid tube or casing, a length of thin film-like tough plastic sheet material such as polyethylene applied as a wrapper wound around the condenser roll and secured by bonding upon itself. This wrapper encloses the condenser roll in the form of a thin-walled jacket or sheath substantially eliminating any such extra working clearance or air space, as is normally present between the prefabricated rigid casing tubes and the condenser rolls enclosed thereby. The width of this plastic film wrapper sheet is such as to extend beyond the ends of the condenser roll proper to form end cups for receiving a sealing compound poured or dropped into the cups and allowed to solidify and to harden.

One important feature of this invention requires that the plastic wrapper sheet material be of the kind that is heat-shrinkable to an appreciable extent, such as is film of irradiated polyethylene. After applying and securing this wrapper around the condenser roll a flowable sealing compound or plastic is applied to the cupped ends of this assembly, and the compound allowed to solidify and harden so as to constitute effective sealing elements. This combination is exposed to a heat imparting environment for effecting the desired shrinkage of the wrapper material while also acting to solidify and harden the plastic sealing substances in the cups. As the wrapper tightens around the body of the roll, the cupped ends thereof contract around the hardened sealing elements thereby encompassing and tightly securing these elements in place.

When such heat-shrinkable wrapper material encases an electrolyte condenser roll in a manner herein contemplated, it thereby substantially eliminates the aforementioned internal air space which otherwise would act as a heat insulating barrier to obstruct the heat to be dispersed outwardly from the condenser roll. More rapid heat dissipation is therefore attainable by the manufacturing improvements of this invention.

Another important function of the plastic wrapper if applied with the precepts of this invention lies in the fact that it constitutes a thin-walled fluid impervious sheath of plastic film film capable of a degree of distention in response to build-up of internal vapor pressure of the electrolyte. Pressure that may build up temporarily is thus absorbable and rendered harmless even as the sheath or jacket re-contracts and the condenser restores itself to normal function, where otherwise such pressure might lead to the escape and permanent loss of some of the electrolyte and even to condenser failure.

According to a more specific feature, the procedure of encasing the condenser roll comprises (a) applying and securing the plastic film wrapper around the condenser roll, (b) with the condenser in upright position applying flowable sealing compound to the upper cupped end and allowing to solidify preliminarily, (c) reversing the upright position of the condenser and applying flowable sealing compound to the then upper end, and (d) immediately exposing the assembly to a heat imparting environment to realize shrinkage of the wrapper as well as solidifying and hardening of the respective seals. An important manufacturing advantage flowing from this invention lies in the fact that the wrapper can be easily applied and secured substantially in a manner of a continuation of the condenser roll winding operation. Time and production cost are thereby saved.

Another manufacturing advantage lies in the fact that the condenser designations can be printed on a continuity of the wrapper strip material so that the designations will appear on a finished product incident to the application of the wrapper material from a running strip of that material.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

FIGURE 1 is a perspective view of one embodiment representing an electrolyte condenser roll showing the elements of assembly thereof, with the wrapper film indicated as a continuation of the roll formation.

FIGURE 2 shows the condenser with the wrapper applied and in upright position for sealing one end thereof.

FIGURE 3 shows the condenser of FIGURE 2 in reverse upright position for sealing the opposite end thereof.

FIGURE 4 shows the condenser with the wrapper heat-shrunk and constricted at the ends.

FIGURE 4a is a greatly enlarged detail of the constricted end operation of the wrapper.

Figure 5:
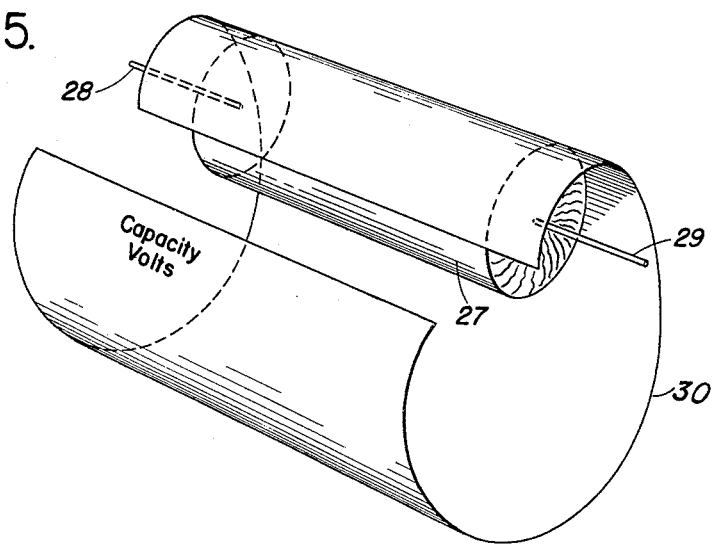
FIGURE 5 is a perspective view of another embodiment representing a non-electrolytic condenser of the non-inductive type, indicating the application of the wrapper film to the condenser roll.

The assembly of the electric condenser of FIGURE 1 comprises a pair of thin metal strips 10 and 11 of equal width and consisting of a material such as tantalum, aluminum, magnesium or beryllium, that lends itself to anodizing. These metal strips are covered and occluded by a deposit of anodically produced oxide film of di-electric properties. These oxide coated metal strips representing the cathode and the anode respectively are spaced from on another in the normal manner by interleaved double layers or strips of low density absorbent condenser paper, for example low density kraft paper. The electrode strip alternates with the paper layers in such a way that a pair of paper strips 12 and 13 is confined between the coated faces of metal strips 10 and 11, while another pair of paper strips 14 and 15 adjoins the inner coated face of metal strip 10. Both pairs of paper strips 12, 13 and 14, 15 are equally wide but wider than the metal strips 10 and 11, the relative widths of the metal strips and of the paper strips bearing the designation $W_1$ and $W_2$ respectively. A condenser roll or body is formed, in the usual manner, by winding the interleaved strips of electrode and spacer material in spiral fashion.

A length 16 of heat-shrinkable plastic film material constitutes the wrapper element for the condenser roll. This wrapper sheet is shown attached or adhered at 17 to an extra length of paper strip 14, thus indicating the manner in which this wrapper element is applicable substantially as a continuation of the process of winding and formation of the condenser roll. Thus, the wrapper strip or sheet, attached at one end to a convolution of the condenser body, is wound in spiral fashion about the body and secured upon itself at its other end, to form a generally cylindrical jacket. Conventional terminals 18 and 19 extend in opposite directions from respective electrode strips 10 and 11.

FIGURES 2, 3, 4 illustrate the steps of manufacture that follow the application of the plastic film wrapper 16 of a width $W_3$ to the condenser roll or body in spiral fashion. That is to say, as the wrapper is wound around the condenser roll it is adhered upon itself as by means of a suitable solvent or bonding agent or it is of a kind that is adhesively conditioned for bonding. With the wrapper secured the cupped ends thereof are subjected to a sealing operation.

A condenser roll 20 is surrounded by the plastic wrapper film 16 constituting a thin sheath or jacket 21 fitted to the diameter of the condenser roll and providing open ends or cups 22 and 23 containing end seals 24 and 25.

In the manufacturing operations that follow the completion of the wrapping step, the condenser is set upright as in FIGURE 2, and a flowable yet solidifiable sealing compound of plastic material is dropped into the upper cup 22 to form the seal or sealing member 24. By way of example, this plastic sealing compound is in the nature of a resinous plastic substance such as the one known as epoxy which has properties whereby upon standing at room temperature it will solidify. Actual hardening is accelerated and realized by exposure to a suitable heat imparting environment. For the present purpose, the sealing compound 23 in FIGURE 2 is allowed to solidify preliminarily for a period of, say, 15 minutes, sufficient for it to assume a consistency at which is will no longer flow or gravitate out of its cup if the condenser is inverted to the FIGURE 3 position. In the FIGURE 3 position sealing compound is dropped or poured into the then upper cup 23 to form the sealing member 25. From the FIGURE 3 step the condenser is at once transferred to a heat environment of, say, 180° F. where it is allowed to remain for a brief period of, say, 5 minutes for the dual purpose of hardening the seals 24 and 25 and for heat-shrinking the plastic wrapper 21. From this heat treatment step the condenser emerges in the condition indicated in FIGURE 4, namely with wrapper hugging the condenser roll, and the free ends of the wrapper constricting to encompass and engage the respective seals 24 and 25 as indicated by the zone of engagement Z thereof (see FIGURE 4 and detail FIGURE 4a), the constricted portion itself being designated by the numeral 26. This operation leaves the condenser with the length "l" a relative minimum as well as with a minimum diameter, and thus more compact as by comparison with the conventional.

The wrapper material for he present purpose is one that is heat-shrinkable, for example irradiated polyethylene aforementioned, and it may suitably be such a material having a potential shrinkage of 10% to 25% or even more. According to one embodiment this material has one adhesive surface so the material will adhere upon itself when wrapped. The characteristics of this material are such that, upon heating as in the FIGURE 4 treatment step, the adhesion will change into a bond or weld strong enough for the wrapper to resist pressure build-up due to vapor pressure, yet also to be resiliently distendable to a slight extent in response to such vapor pressure until the same subsides as the condenser restores itself to normal function.

The FIGURE 5 embodiment illustrates the invention as applied to a non-electrolytic condenser of the non-inductive type such as characterized by the overlapping relationship of a pair of metal foil strips, $F_1$ and $F_2$ (see FIGURES 6 and 7) having exposed portions $F_2^1$ and $F_2^1$ constituting the respective ends of the condenser roll which in turn is designated by the numeral 27. The usual terminals 28 and 29 are shown to extend from the respective ends of the condenser roll. A wrapper sheet 30 of plastic film appears in FIGURE 5 illustrating its initial phase of application to the condenser roll.

Figure 6:
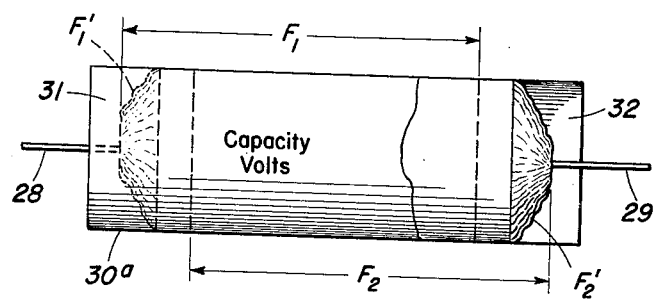
FIGURE 6 is a side view of FIGURE 5 embodiment with the wrapper applied and secured.
Figure 7:
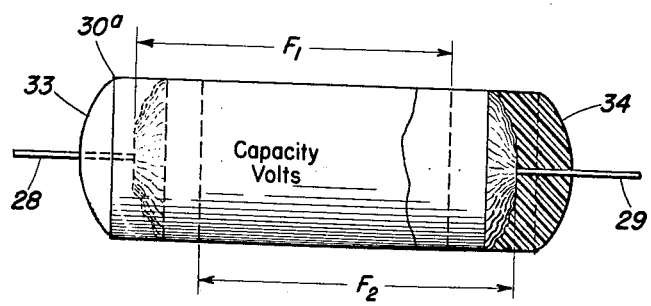
FIGURE 7 is a side view similar to that of FIGURE 6 with seals applied to the ends of the condenser.

The wrapper as fully applied to the condenser roll is designated by the numeral 30ª in the side view showing of FIGURE 6, forming cupped end portions or cups 31 and 32 to receive and hold a sealing compound to constitute respective end seals 33 and 34.

It will be understood that the wrapper is applied to, and wound around the condenser roll or body in spiral fashion to constitute a jacket that is closely fitted to the diameter of the condenser roll so that air spaces within the condenser are eliminated or minimized.

Where a wrapper of heat-shrinkable material is employed, it is the shrinkage that may be relied upon to eliminate the air spaces, to improve heat dispersion, to secure the end seals, and, in the case of the electrolytic condenser, to reduce the possibility of periodical loss of electrolyte.

I claim:

1. The method of making an electronic condenser, which comprises interleaving strips of electrode and spacer material, winding said interleaved strips in spiral fashion to form a condenser body, winding a wrapper strip in spiral fashion about said condenser body to form a continuous jacket surrounding and conforming closely to said condenser body, said wrapper strip being formed of heat-shrinkable material and having a width such that, upon winding thereof to form said jacket, portions of the jacket project beyond the ends of said condenser body to form cups, end seals are formed in said cups, and projecting portions of said jacket are closed over end surface portions of said end seals upon shrinking of said jacket, and subjecting said wrapper strip to heating, following the winding thereof to form said jacket, whereby said jacket is shrunk and tends to maintain said condenser body under compression.

2. An electronic condenser, comprising a plurality of interleaved strips of electrode and spacer material, said strips being wound in spiral fashion to form a condenser body, and a wrapper strip secured at one end to a convolution of said wound strips and being wound around said condenser body in spiral fashion, said wrapper strip being secured at its other end upon itself to form a continuous jacket surrounding and conforming closely to said condenser body, said wrapper strip being formed of a material subject to shrinkage and being of such a width to project beyond the axial ends of said condenser body, sealing caps are provided at each end of said condenser body and are surrounded by said wrapper strip, and said wrapper strip is shrunk to an extent such that the projecting ends of said wrapper strip tightly enclose said sealing caps and said condenser body to maintain said condenser body under compression.

References Cited in the file of this patent

UNITED STATES PATENTS

| | | |
|---|---|---|
| 1,811,067 | Valle | June 23, 1931 |
| 1,865,640 | Nyman | July 5, 1932 |
| 2,090,360 | Sprague | Aug. 17, 1937 |
| 2,134,273 | Bush | Oct. 25, 1938 |
| 2,622,133 | Dorst | Dec. 16, 1952 |
| 2,729,878 | Grouse | Jan. 10, 1956 |
| 2,785,352 | Netherwood | Mar. 12, 1957 |
| 2,816,273 | Peck | Dec. 10, 1957 |
| 2,887,649 | Peck | May 19, 1959 |